United States Patent
Leung et al.

(10) Patent No.: US 8,775,634 B2
(45) Date of Patent: Jul. 8, 2014

(54) FACILITATING MOBILITY FOR A MOBILE STATION

(75) Inventors: Kent K. Leung, Los Alton, CA (US); Jayaraman R. Iyer, Sunnyvale, CA (US); Viren K. Malaviya, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 12/885,898

(22) Filed: Sep. 20, 2010

(65) Prior Publication Data

US 2011/0007742 A1 Jan. 13, 2011

Related U.S. Application Data

(63) Continuation of application No. 11/173,051, filed on Jul. 1, 2005, now Pat. No. 7,813,511.

(51) Int. Cl.
G06F 15/173 (2006.01)

(52) U.S. Cl.
USPC .......................................... 709/227; 709/238

(58) Field of Classification Search
None
See application file for complete search history.

(56) References Cited

U.S. PATENT DOCUMENTS

| | | | |
|---|---|---|---|
| 7,339,903 B2 | 3/2008 | O'Neill | |
| 7,350,077 B2 | 3/2008 | Meier et al. | |
| 7,356,020 B2 | 4/2008 | O'Neill | |
| 7,409,549 B1 | 8/2008 | Leung et al. | |
| 7,441,269 B2 | 10/2008 | Jones et al. | |
| 2002/0114469 A1 | 8/2002 | Faccin et al. | |
| 2004/0073786 A1 | 4/2004 | O'Neill et al. | |
| 2004/0077335 A1 | 4/2004 | Lee et al. | |
| 2004/0087304 A1 | 5/2004 | Buddhikot et al. | |
| 2004/0095913 A1* | 5/2004 | Westphal | 370/338 |
| 2004/0236939 A1 | 11/2004 | Watanabe et al. | |
| 2005/0025091 A1 | 2/2005 | Patel et al. | |
| 2005/0044365 A1 | 2/2005 | Haukka et al. | |
| 2005/0129034 A1* | 6/2005 | Takeyoshi et al. | 370/401 |
| 2005/0152305 A1 | 7/2005 | Ji et al. | |
| 2005/0254656 A1 | 11/2005 | Rose et al. | |
| 2006/0036733 A1 | 2/2006 | Fujimoto et al. | |
| 2006/0274695 A1 | 12/2006 | Krishnamurthi et al. | |
| 2007/0250712 A1 | 10/2007 | Salgado et al. | |
| 2009/0208013 A1 | 8/2009 | Watanabe et al. | |

FOREIGN PATENT DOCUMENTS

| | | |
|---|---|---|
| CN | 1588919 | 9/2004 |
| CN | 1564626 A | 1/2005 |

OTHER PUBLICATIONS

Perkins, Charles and Johnson, David. "Route Optimization in Mobile IP". Feb. 25, 1999.*

State Intellectual Property Office of the People's Republic of China, The First Office Action and Text of the First Office Action, transmitted to Baker Botts Mar. 20, 2009, Chinese and English translation, 18 pages.

(Continued)

Primary Examiner — Scott Christensen
(74) Attorney, Agent, or Firm — Baker Botts L.L.P.

(57) ABSTRACT

Providing a mobility key for a communication session for a mobile station includes facilitating initiation of the communication session. A master key for the communication session is established, where the master key is generated at an authentication server in response to authenticating the mobile station. A mobility key is derived from the authentication key at an access node, where the mobility key is operable to authenticate mobility signaling for the communication session.

10 Claims, 3 Drawing Sheets

(56) References Cited

OTHER PUBLICATIONS

The Patent Office of the People's Republic of China, The Second Office Action and Text of the Second Office Action, Application No. 200680020027.0 transmitted to Baker Botts Nov. 16, 2009, 9 pages.
PCT Notification of Transmittal of the International Search Report and the Written Opinion of the International Searching Authority, or the Declaration with attached PCT International Search Report and Written Opinion of the International Searching Authority in International Application No. PCT/US 06/25514, dated May 3, 2007, 8 pages.
Tomás Balderas-Contreras, et al., "Security Architecture in UMTS Third Generation Cellular Networks", Reporte Técnico No. CCC-04-002, © Coordinación de Ciencias Computacionales, Instituto Nacional de Astrofísica, Óptica y Electrónica, INAOE, 19 pages, Feb. 27, 2004.
State Intellectual Property Office of the People's Republic of China, The Third Office Action and Text of the Third Office Action, transmitted to Baker Botts Feb. 1, 2011, Chinese and English translation, 18 pages.
The People's Republic of China Fourth Office Action, in Chinese Application No. 200680020027.0 (with translation), dated Jul. 14, 2011 (transmitted to Applicants on Aug. 29, 2011), 9 pages.
The First Office Action from The patent Office of the People's Republic of China in Application No. 200910166343.4, dated Apr. 20, 2012 (received Aug. 14, 2012), 30 pages.
The Second Office Action from the State Intellectual Property Office of the People's Republic of China in Application No. 200910166343.4, dated Nov. 26, 2012 (received from foreign associate, Jan. 24, 2013), 22 pages.
The Third Office Action from The State Intellectual Property Office of the People's Republic of China in Application No. 200910166343.4, dated May 9, 2013, 7 total pages.

* cited by examiner

FACILITATING MOBILITY FOR A MOBILE STATION

CROSS REFERENCE TO RELATED APPLICATION

This application is a continuation of U.S. Ser. No. 11/173,051 filed Jul. 1, 2005 and entitled "Facilitating Mobility for a Mobile Station".

TECHNICAL FIELD

This invention relates generally to the field of communications and more specifically to facilitating mobility for a mobile station.

BACKGROUND

A communication network may establish a communication session for a mobile station. The communication session allows the mobile station to communicate with other endpoints. The mobile station may move to another location serviced by a different communication network. Accordingly, techniques are implemented to allow the next communication network to support the communication session.

Known techniques, however, are not efficient in certain situations. It is generally desirable to have efficient techniques in certain situations.

SUMMARY OF THE DISCLOSURE

In accordance with the present invention, disadvantages and problems associated with previous techniques for facilitating mobility for a mobile station may be reduced or eliminated.

According to one embodiment of the present invention, providing a mobility key for a communication session for a mobile station includes facilitating initiation of the communication session. A master key for the communication session is established, where the master key is generated at an authentication server in response to authenticating the mobile station. A mobility key is derived from the authentication key at an access node, where the mobility key is operable to authenticate mobility signaling for the communication session.

Certain embodiments of the invention may provide one or more technical advantages. A technical advantage of one embodiment may be that a mobility key may be derived from a master key. Deriving the mobility key may provide for a more readily available key. Another technical advantage of one embodiment may be that a route may be optimized to bypass a home agent. Bypassing the home agent may provide for more efficient communication.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
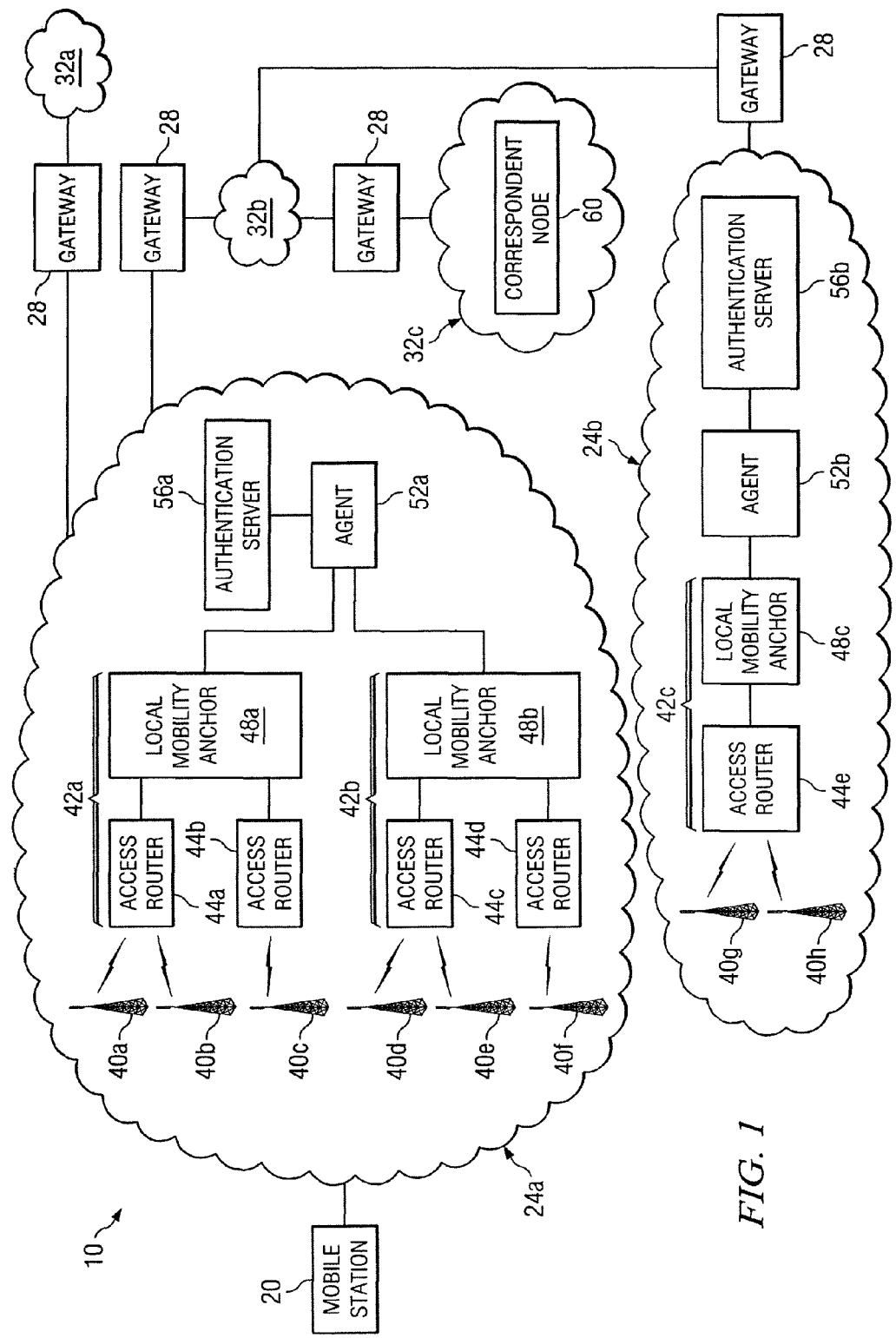
FIG. 1 is a block diagram illustrating one embodiment of a system operable to facilitate mobility for a mobile station.
Figure 2:
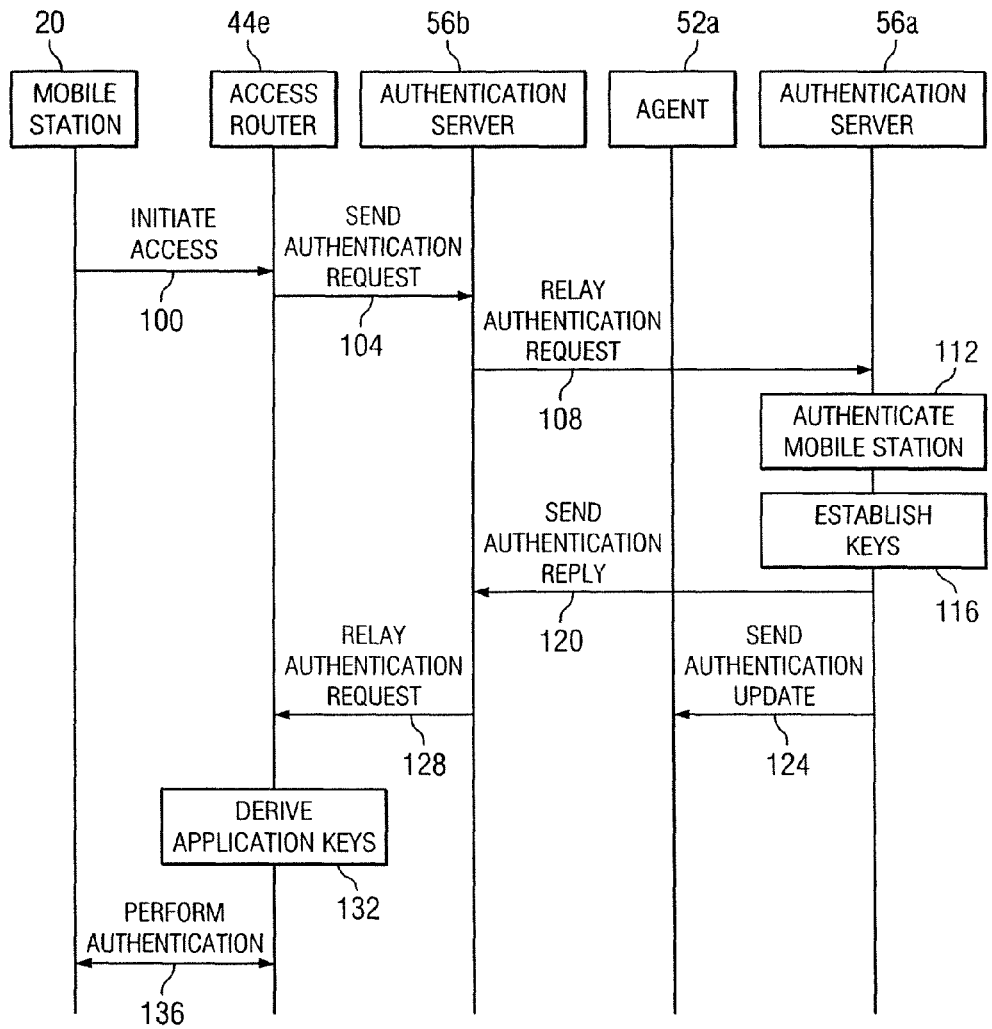
FIG. 2 is a call flow diagram illustrating one embodiment of a method for providing a mobility key for a communication session.
Figure 3:
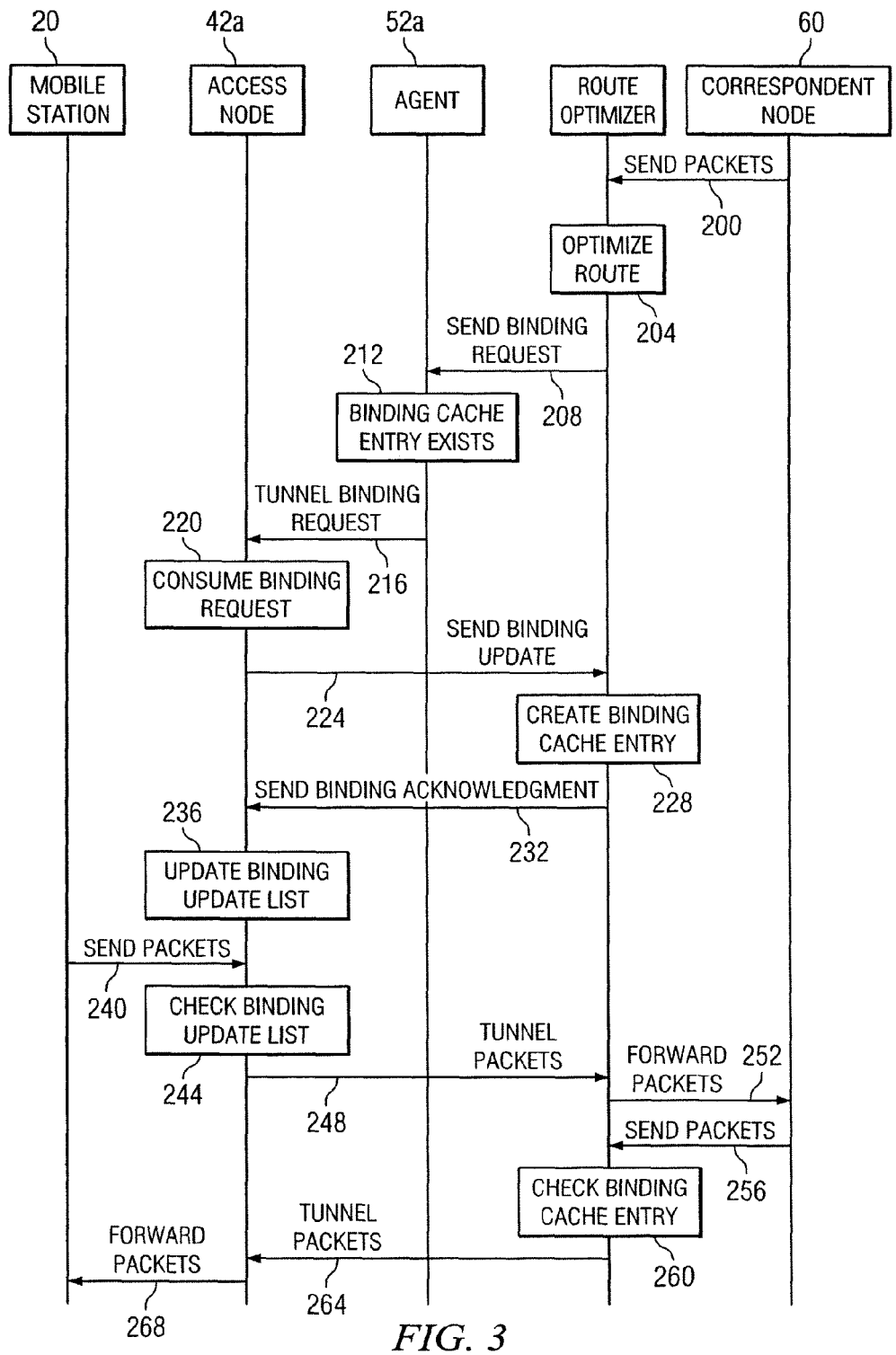
FIG. 3 is a call flow diagram illustrating one embodiment of a method for optimizing a route for a communication session.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 operable to facilitate mobility for a mobile station. System 10 may provide a mobility key for a communication session for the mobile station. To provide the mobility key, a master key for the communication session may be established. The mobility key may then be derived from the master key. System 10 may also provide route optimization for the communication session. The optimized route communicates the session along a path that bypasses a home agent for the mobile station.

According to the illustrated embodiment, a mobile station 20 may represent any suitable logic comprising software, hardware, other logic, or any suitable combination of the preceding operable to communicate with a communication system. Mobile station 20 may comprise, for example, a personal digital assistant, a cellular telephone, a mobile handset, or any other device operable to communicate with system 10.

System 10 may operate to provide telephony services, such as communication sessions, for endpoints such as mobile station 20. A communication session may refer to an active communication between endpoints, measured from endpoint to endpoint. Information is communicated between endpoints during a communication session. Information may refer to data, text, audio, video, multimedia, other suitable type of information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) or mobile IP may be used to communicate the packets.

System 10 and mobile station 20 may utilize digital cellular protocols and technologies for the communication sessions. Example digital cellular protocols and technologies include those set by the Institute of Electrical and Electronics Engineers, Inc. (IEEE) 802.11 standards, the Global System for Mobile communications (GSM) standards, the Internet Engineering Task Force (IETF) standards, or other standards. GSM standards may support technology such as general packet radio service (GPRS) technologies, and IETF standards may support code division multiple access (CDMA) technologies.

According to the illustrated embodiment, system 10 includes a home network 24a, a foreign network 24b, one or more gateways 28, and one or more other networks 32 coupled as shown. According to the embodiment, networks comprise communication networks that facilitate communications sessions for mobile station 20. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Home network 24a may represent a communication network at which mobile station 20 is permanently registered, and foreign network 24b may represent a communication network in which mobile station 20 is currently located. According to the illustrated embodiment, each network 24 comprises one or more base stations 40, one or more access nodes 42, a home agent 52, and an authentication server 56 coupled as shown.

A base station 40 provides mobile station 20 with wireless access to system 10. Base station 40 may include a base transceiver station and a base station controller. The base transceiver station communicates signals to and from mobile station 20. The base station controller manages the operation of the base transceiver station. The wireless link between mobile station 20 and base station 40 is typically a radio frequency link that may be cellular in network organization.

An access node 42 may represent a point of a network that provides access to network 24, and may provide access services such as protocol conversion, packet encapsulation and decapsulation, or other service. Access node 42 may comprise any suitable arrangement of components, such as one or more access routers 44, one or more local mobility anchors 48, or any combination of the preceding. As an example, an access node 42 may include one or more access routers 44, but no local mobility anchors 48. As another example, an access node 42 may include one or more access routers 44 and one or more local mobility anchors 48.

Access router 44 may represent any suitable logic comprising software, hardware, other logic, or any combination of the preceding operable to connect asynchronous devices such as mobile station 20 to network 24. According to one embodiment, access router 44 may provide a point at which the Open Systems Interconnection (OSI) Model Layer 2 signaling meets Layer 3 signaling for mobile station 20.

Local mobility anchor 48 may represent any suitable logic comprising software, hardware, other logic, or any combination of the preceding operable to provide mobility management aggregation services for access routers 44. In general, an anchor may refer to a point of a network that manages roaming connections for a communication session. Local mobility anchor 48 operates like an agent 52 from the viewpoint of access routers 44, and operates like an access router 44 from the viewpoint of agent 52. According to one embodiment, local mobility anchor 48 may encapsulate and decapsulate traffic, such as data traffic.

A component of access node 42 may intercept and consume messages directed to another node. According to one embodiment, local mobility anchor 48 may intercept a signaling message directed to another node, such as mobile station 20. A signaling message may refer to a message that includes an instruction to perform an operation to set up, manage, or tear down a communication session. A message may be directed to a node by having the address of the node as the destination address.

According to the embodiment, local mobility anchor 48 may intercept a signaling message that is directed to another node. Local mobility anchor 48 may be programmed to intercept specific signaling messages directed to the other node. Local mobility anchor 48 may consume the signaling message by performing the operation of the message, and not forwarding the message to the other node.

An agent 52 may represent any suitable logic comprising software, hardware, other logic, or any suitable combination of the preceding operable to provide mobility management services for mobile station 20. Home agent 52a of mobile station 20 may represent an agent that maintains the address of mobile station 20 and forwards packets to mobile station 20. According to one embodiment, home agent 52 may generate a master key, from which a mobility key may be derived. The master key and mobility key are described in more detail with reference to FIG. 2. Foreign agent 52b of mobile station 20 may represent an agent that provides home agent 52a of mobile station 20 with a care-of address to which packets for mobile station 20 node may be forwarded.

If mobile station 20 is in an area serviced by home agent 52a, home agent 52a forwards traffic to the location address of mobile station 20. If mobile station moves to an area serviced by foreign agent 52b, foreign agent 52b notifies home agent 52a that mobile station 20 has moved, and sends a care-of address for mobile station 20 to home agent 52a. Home agent 52a forwards traffic to the care-of address.

Authentication server 56 may represent any suitable logic comprising software, hardware, other logic, or any suitable combination of the preceding operable to provide services for authentication, authorization, accounting, or any suitable combination of the preceding. Authentication may refer to authenticating a mobile station 20. Authorization may refer to authorizing a level of service for mobile station 20. Accounting may refer to tracking the usage of resources. As an example, authentication server 56 may provide one, two, or three of the listed services.

A gateway 28 may represent any suitable logic comprising software, hardware, other logic, or any suitable combination of the preceding operable to interconnect networks 24 and 32. Gateway 28 may perform protocol conversion. For example, gateway 28 may convert communications from the protocol of one network to the protocol of another network. According to one embodiment, gateway 28 may include a route optimizer that provides route optimization. Route optimization is described in more detail with reference to FIG. 3.

A network 32 may represent any suitable communication network. As an example, network 32a may represent a legacy network. As another example, network 32b may represent a Internet Protocol (IP) network that operates according to the Internet Protocol. As yet another example, network 32c may represent an intranet that includes a correspondent node 60 engaged in a communication session with mobile station 20. Correspondent node 60 may represent any suitable logic comprising software, hardware, other logic, or any suitable combination of the preceding operable to communicate with mobile station 20.

A component of system 10 may include an interface, logic, memory, or any suitable combination of the preceding. As used in this document, "interface" refers to any suitable structure of a device operable to receive input for the device, send output from the device, translate input or output or both, or perform any combination of the preceding, and may comprise one or more ports. Logic manages the operation of module, and may comprise any suitable hardware, software, or combination of hardware and software. For example, logic may include a processor. As used in this document, "processor" refers to any suitable device operable to execute instructions and manipulate data to perform operations.

As used in this document, "memory" refers to any structure operable to store and facilitate retrieval of information used by a processor, and may comprise Random Access Memory (RAM), Read Only Memory (ROM), magnetic drives, disk drives, Compact Disk (CD) drives, Digital Video Disk (DVD)

drives, removable media storage, any other suitable data storage device, or a combination of any of the preceding.

The mobility state of mobile station 20 may be maintained by access node 42 and other nodes of system 10 that facilitate a communication session for mobile station 20, such as home agent 52a and gateways 28. The mobility state may be described by a binding cache entry, a binding update list, a data flow cache entry, other mobility descriptor, or any combination of the preceding.

A binding cache entry records information for routing packets to mobile station 20. For example, a binding cache entry may record an address, such as home address or a care-of address or both, to which packets for mobile station 20 may be forwarded. The binding cache entry may include other information about mobile station 20, such as the state of the communication session of mobile station 20. A binding update list records information for routing packets to correspondent node 60. For example, a binding update list may record addresses for access routers or gateways used by correspondent node 60. A data flow cache entry may refer to information learned from received data flows.

Messages may provide or request mobility state information. For example, a binding update from a sender provides updated routing information about the sender. A binding acknowledgement confirms that a binding update was received. A binding request from a sender to a receiver requests that the receiver send a binding update to the sender. A binding delete from a sender to a receiver requests that the receiver remove the binding cache entry associated with the sender.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of access router 44 and local mobility anchor 48 may be performed by one module, or the operations of agent 52a may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a call flow diagram illustrating one embodiment of a method for providing a mobility key for a communication session. To provide the mobility key, a master key for the communication session may be established. The mobility key may then be derived from the master key.

The method begins at step 100, where mobile station 20 initiates access to foreign network 24b through foreign access router 44e of network 24b. Access router 44e sends an authentication request to foreign authentication server 56b at step 104. An authentication request may refer to a message that requests authentication for a node. The message may also request other services such as authorization, accounting, other service, or any combination of the preceding.

Authentication server 56b relays the authentication request to home authentication server 56a at step 108. Authentication server 56a authenticates mobile station 20 at step 112. According to one embodiment, home authentication server 56a authenticates mobile station 20 according to an authentication key. A key may refer to an encryption key or decryption key. An authentication key may refer to a key that is used to verify the authenticity of a mobile station 20. According to one embodiment, a mobile station-authentication server (MS-AS) key may be used to authenticate mobile station 20. An MS-AS key may refer to an authentication key shared between mobile station 20 and home authentication server 56a.

Authentication server 56a derives a master key at step 116. In general, a second key may be derived from a first key by applying a procedure or algorithm to the first key to yield the second key. A master key may refer to an authentication key that is used to authenticate mobile station 20 for a particular time. For example, a master key comprising a master session key may refer to an authentication key that is used to authenticate mobile station 20 for a particular communication session. According to one embodiment, home authentication server 56a derives a master session key from the MS-AS key.

Authentication server 56a sends an authentication reply to foreign authentication server 56b at step 120. According to one embodiment, the authentication reply includes the master session key. Home authentication server 56a sends an authentication update to home agent 52a at step 124. The update includes an application key. An application key may refer to an authentication key that is used to authenticate mobile station 20 for a particular application, such as a mobility or access application. According to one embodiment, the application key comprises a mobile IP application key derived from the master session key for the duration of the registration process. Foreign authentication server 56a relays the authentication reply to access router 44a at step 128. The reply includes the master session key.

Access router 44e derives application keys from the master key at step 132. According to one embodiment, a mobility key and an access key may be derived from the master session key. A mobility key may refer to an authentication key that may be used to provide mobility management, such as Layer 3 mobility management. The key may be used to authenticate signaling among network nodes during a handoff procedure. According to the embodiment, a mobile station-network node key may be used to authenticate signaling to the network node in order to send signaling messages to the network node. For example, a mobile station-home agent (MN-HA) key may be used to authenticate signaling to home agent 52a. The MN-HA key may be used on the behalf of mobile station 20 to send a signaling message, such as a binding update, to home agent 52a.

An access key may refer to an authentication key that is used to provide access authentication, such a authentication for example Layer 2 access. According to the embodiment, the derived access key may comprise a mobile station-access router (MS-AR) Layer 2 key that provides Layer 2 access while access router 44 is facilitating the communication session for mobile node 20.

Access authentication is performed at step 136 using the derived mobility key. According to one embodiment, the derived mobility key may comprise the MS-AR key. After performing access authentication, the method terminates.

Modifications, additions, or omissions may be made to the method without departing from the scope of the invention. The method may include more, fewer, or other steps. Additionally, steps may be performed in any suitable order without departing from the scope of the invention.

FIG. 3 is a call flow diagram illustrating one embodiment of a method for optimizing a route for a communication session. The method may optimize a communication path by bypassing home agent 52a. The method may be performed by a first embodiment, a second embodiment, or other suitable embodiment. According to the first embodiment, access node 42 includes one or more access routers 44. According to the second embodiment, access node 42 includes one or more access routers 44 and one or more local mobility anchors 48.

The method begins at step 200, where correspondent node 60 sends packets to a route optimizer. The route optimizer may be located at gateway 28 or other suitable node of system 10. The route optimizer determines whether route optimization is to be performed at step 204. The determination may be made by establishing the non-optimized route and determining whether bypassing home agent 52a would optimize the route. In this example, the route optimizer determines that route optimization is to be performed.

The route optimizer sends a binding request to home agent 52a at step 208. The binding request requests that a receiver sends a binding update of mobile station 20 to the route optimizer, and may be sent as a control message. Home agent 52a has a binding cache entry for mobile station 20 at step 212, and tunnels the binding request to access node 42a at step 216.

Access node 42a consumes the binding request at step 220, and sends a binding update at step 224. The binding update includes the home address of access node 42a, and may be sent as a control message. Steps 220 and 224 may be performed by the first embodiment, the second embodiment, or other suitable embodiment. According to the first embodiment, access router 44a consumes the binding request at step 220, and sends the binding update at step 224. According to the second embodiment, local mobility anchor 48a consumes the binding request at step 220, and sends the binding update at step 224.

The route optimizer creates a binding cache entry for mobile station 20 at step 228. The binding cache entry records access node 42a as the home address of mobile station 20. Step 228 may be performed by the first embodiment, the second embodiment, or other suitable embodiment. According to the first embodiment, the recorded access node 42a is access router 44a. According to the second embodiment, the recorded access node 42a is local mobility anchor 48a. The route optimizer sends a binding acknowledgement to access node 42a at step 232. The binding acknowledgement includes the home address of the route optimizer. Access node 42a updates its binding update list at step 236. The binding update list records that correspondent node 60 communicates through the route optimizer.

Mobile station 20 sends a packet destined for correspondent node 60 to access node 42a at step 240. Access node 42a checks its binding update list at step 244. The binding update list indicates that correspondent node 60 may be reached through the route optimizer. Access node 42a tunnels the packet to the route optimizer at step 248. Steps 244 and 248 may be performed by the first embodiment, the second embodiment, or other suitable embodiment. According to the first embodiment, access router 44a receives the packet from mobile station 20, and tunnels the packet to the route optimizer. According to the second embodiment, access router receives the packet from mobile station 20, and tunnels the packet to local mobility anchor 48. Local mobility anchor identifies the route optimizer, and tunnels the packet to the route optimizer. The route optimizer forwards the packet to correspondent node 60 at step 252.

Correspondent node 60 sends a packet destined for mobile station 20 to the route optimizer at step 256. The route optimizer checks its binding cache entry for mobile station 20 at step 260, and tunnels the packet to access node 42a according to the entry at step 264. Steps 260 and 264 may be performed by the first embodiment, the second embodiment, or other suitable embodiment. According to the first embodiment, the binding cache entry at the route optimizer instructs the route optimizer to tunnel the packet directly to access router 44a. According to the second embodiment, the binding cache entry at the route optimizer instructs the route optimizer to tunnel the packet to local mobility anchor 48a. The binding cache entry at local mobility anchor 48a has a binding cache entry for mobile station instructs local mobility anchor 48a to tunnel the packet to access router 44a. Access node 42 forwards the packet to mobile station at step 268.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a mobility key may be derived from a master key. Deriving the mobility key may provide for a more readily available key. Another technical advantage of one embodiment may be that a route may be optimized to bypass a home agent. Bypassing the home agent may provide for more efficient communication.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for optimizing a route for a communication session at a route optimizer, comprising:
    facilitating initiation of a communication session between a mobile station and a correspondent node;
    determine that a home agent of the mobile station should not be included in a path of the communication session;
    based on the determination that the home agent of the mobile station should not be included in the path of the communication session,
        sending a binding request to home agent of the mobile station for forwarding to an access node comprising an access point to a communication network in which the mobile station is located, the binding request requesting a binding update for the mobile station,
        receiving, from the access node, a binding update in response to the binding request,
            the binding update identifying an access node address of the access node providing access to the mobile station,
            the binding update received directly from the access node such that the home agent of the mobile station is bypassed;
        creating a binding cache entry for the mobile station, the binding cache entry recording the access node of the access point to the communication network;
        communicating, directly from the route optimizer to the access node, a binding acknowledgement representing the access point to the communication network, wherein the binding acknowledgement comprises a home address of the route optimizer; and
        bypassing the home agent to facilitate communication of the communication session.

2. The method of claim 1, wherein bypassing the home agent to facilitate continuation of the communication session further comprises:
    establishing a tunnel between the route optimizer and the access node using the access node address; and
    tunneling a packet to the access node.

3. The method of claim 1, wherein a gateway associated with the correspondent node comprises the route optimizer.

4. A route optimizer for optimizing a route for a communication session, comprising:
   programming stored on a computer readable device, the programming operable to:
      facilitate initiation of a communication session between a mobile station and a correspondent node, and
      determine that a home agent of the mobile station should not be included in a path of the communication session; and
   an interlace coupled to the logic and operable to, based on the determination that the home agent of the mobile station should not be included in the path of the communication session:
      send a binding request to the home agent of the mobile station for forwarding to an access node comprising an access point to a communication network in which the mobile station is located, the binding request requesting a binding update for the mobile station,
      receive, from the access node, a binding update in response to the binding request,
         the binding update identifying an access node address of the access node providing access to the mobile station,
         the binding update received directly from the access node such that the home agent of the mobile station is bypassed;
   the logic further operable to:
   create a binding cache entry for the mobile station, the binding cache entry recording the access node address of the access point to the communication network;
   communicate, directly from the route optimizer to the access node, a binding acknowledgement comprising the access point to the communication network, wherein the binding acknowledgment comprises a home address of the route optimizer; and
   facilitate continuation of the communication session along a path that bypasses the home agent.

5. The route optimizer of claim 4, the logic further operable to facilitate continuation of the communication session along a path that bypasses the home agent by:
   establishing a tunnel to the access node using the access node address; and
   tunneling a packet to the access node.

6. The route optimizer of claim 4, wherein a gateway associated with the correspondent node comprises the route optimizer.

7. The route optimizer of claim 4, wherein:
   the logic further is operable to facilitate continuation of the communication session along a path that bypasses the home agent by:
      establishing a tunnel to the access node using the access node address; and
      tunneling a packet to the access node; and
   a gateway associated with the correspondent node comprises the route optimizer.

8. A system for optimizing a route for a communication session, comprising:
   a route optimizer operable to:
      facilitate initiation of a communication session between a mobile station and a correspondent node;
      determine whether to include a home agent of the mobile station in a path of the communication session; and
      send a binding request requesting a binding update for the mobile station to the home agent of the mobile station, the home agent in communication with the route optimizer and operable to:
         receive the binding request; and
         forward the binding request to an access node providing access to a network by the mobile station;
   the access node, the access node comprising an access point to a communication network in which the mobile station is located and in communication with the mobile station and the route optimizer and operable to:
      receiving the binding request from the home agent; and
      send a binding update in response to the binding request directly to the route optimizer, the binding update identifying an access node address of the access node corresponding to the mobile station, wherein the sending is based in part on a determination to not include the home agent in the path of the communication session;
   the route optimizer further operable to:
      receive the binding update directly from the access node comprising the access point such that the home agent of the mobile station is bypassed;
      create a binding cache entry for the mobile station, the binding cache entry recording the access node address;
      communicating, directly from the route optimizer, a binding acknowledgement to the access node comprising the access point to the communication network, wherein the binding acknowledgement comprises a home address of the route optimizer; and
      facilitate continuation of the communication session by bypassing the home agent based on the determination to not include the home agent in the path of the communication session.

9. The network of claim 8, the route optimizer further operable to facilitate continuation of the communication session by bypassing the home agent by:
   establishing a tunnel between the route optimizer and the access node using the access node address; and
   tunneling a packet to the access node.

10. The network of claim 8, wherein a gateway associated with the correspondent node comprises the route optimizer.

* * * * *